United States Patent [19]

Takenaka et al.

[11] Patent Number: 4,886,153

[45] Date of Patent: Dec. 12, 1989

[54] COOLING MECHANISM OF A CLUTCH COVER ASSEMBLY

[75] Inventors: Mitsuhiko Takenaka; Mitsuo Higashiji, both of Neyagawa, Japan

[73] Assignee: Kabushiki Kaisha Daikin Seisakusho, Osaka, Japan

[21] Appl. No.: 199,411

[22] PCT Filed: Oct. 5, 1987

[86] PCT No.: PCT/JP87/00744

§ 371 Date: Apr. 6, 1988

§ 102(e) Date: Apr. 6, 1988

[87] PCT Pub. No.: WO88/02826

PCT Pub. Date: Apr. 21, 1988

[30] Foreign Application Priority Data

Oct. 16, 1986 [JP] Japan ................... 61-158761

[51] Int. Cl.⁴ ............................................. F16D 13/72
[52] U.S. Cl. ................... 192/113 A; 192/70.12
[58] Field of Search ............... 192/113 A, 70.12, 30 V

[56] References Cited

U.S. PATENT DOCUMENTS

| 1,635,353 | 7/1927 | Alley | 192/113 A |
| 2,885,047 | 5/1959 | Kehrl | 192/70.12 |
| 4,382,497 | 5/1983 | Sakai et al. | 192/113 A |
| 4,657,128 | 4/1987 | Fujito et al. | 192/113 A |
| 4,667,794 | 5/1987 | Martinez-Corral et al. | 192/113 A |

FOREIGN PATENT DOCUMENTS

| 57-40727 | 3/1982 | Japan . | |
| 60-145625 | 9/1988 | Japan . | |
| 2181193 | 4/1987 | United Kingdom | 192/113 A |

Primary Examiner—James R. Brittain
Assistant Examiner—Brian K. Green
Attorney, Agent, or Firm—Armstrong, Nikaido, Marmelstein, Kubovcik & Murray

[57] ABSTRACT

A cooling mechanism for a clutch cover assembly having a diaphragm spring with radially extending tongues and slits between such tongues characterized by that on spaced of the tongues and adjacent to the clutch cover body are disposed vane members having vanes projecting at the slits of such spaced tongues for feeding cooling air into the slits and vane supports formed integrally with the vanes for fixing the vane members to the tongues. The air is discharged through ventilation ports in the clutch cover.

4 Claims, 3 Drawing Sheets

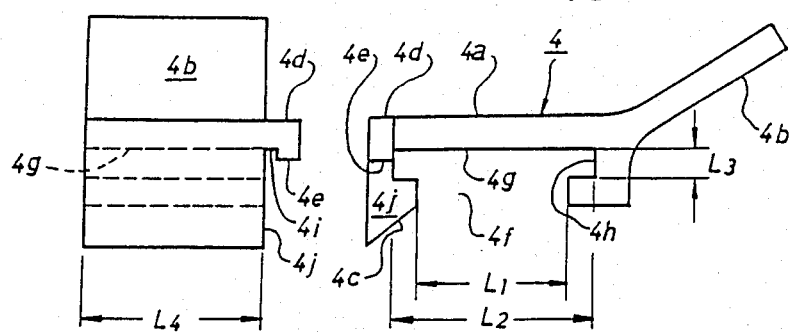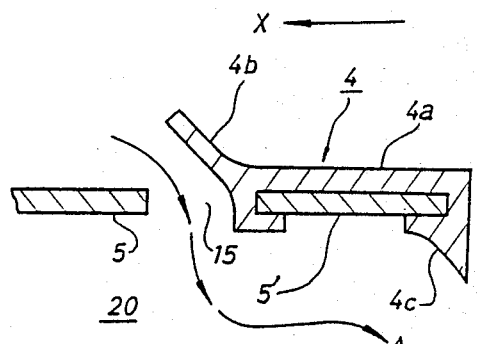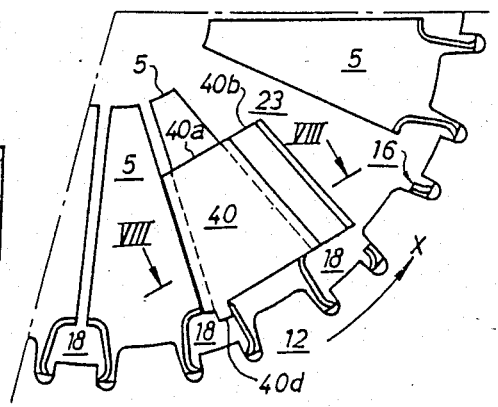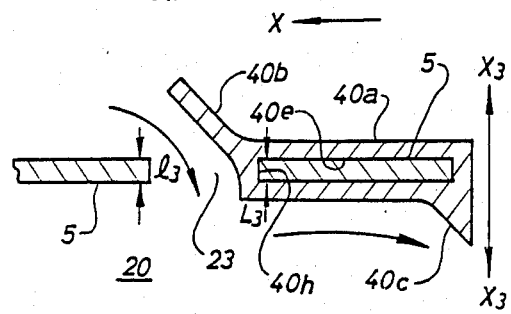

COOLING MECHANISM OF A CLUTCH COVER ASSEMBLY

TECHNICAL FIELD

The present invention relates to a cooling mechanism clutch cover assembly used in friction clutches for automobiles.

BACKGROUND ART

Referring to FIG. 9 showing a conventional clutch cover assembly, flywheel 11 driven by an engine (not shown) is concentrically fixed to an outer peripheral portion of a clutch cover body 12 of a dish-like form having a central aperture of large diameter.

The flywheel 11 and the clutch cover body 12 form an internal space 20, in which a clutch disk 13 is concentrically disposed and is connected to an output shaft (not shown). A pressure plate 14 for pressing the clutch disk 13 toward the flywheel 11 is concentrically disposed in the internal space 20 between the disk 13 and the clutch cover body 12.

A diaphragm spring 16 which is formed by an annular metal member is used for pressing the clutch disk 13 onto the flywheel 11 by the pressure plate 14.

The diaphragm spring 16 is integrally provided at the radially outer portion with an annular spring portion 16a, and is integrally provided at the radially inner portion with many radial tongues 5 extending radially inwardly from the inner periphery of said annular spring portion 16a. These tongues 5 form slits 15 therebetween. The openings 18 are formed radially outside the slits 15.

A pair of metal wire rings 17 having the same radii are pinched on opposite surfaces of the diaphragm spring 16 by pins 19 fitted in the openings 18, respectively.

At the side of the diaphragm spring 16 opposite to the flywheel 11 is disposed a release bearing, which is slidable along the output shaft and is connected through a link mechanism (not shown) to a clutch pedal, so that it may push the tongues 5 of the diaphragm spring 16 toward the flywheel 11.

In the above structures, when the clutch is engaged, the diaphragm spring 16 elastically presses the pressure plate 14 toward the flywheel 11 using the wire rings 17 as the fulcrum, so that the clutch disk 13 is pressed onto the flywheel 11 by the pressure plate 14. Thus, the rotational force of the flywheel 11 is transmitted to the clutch disk 13.

However, in the above structures, the flywheel 11 and the clutch disk 13 as well as the clutch disk 13 and the pressure plate 14 frequently slide on each other causing friction heat. They do not have a cooling function, so that the heat generated in the clutch disk 13 causes rapid wear of the clutch disk 13, and, in severe use condition, causes thermal damage to the friction member and curvature of the pressure plate 14.

In order to cool the friction parts, structures, such as shown in FIG. 10 have been proposed, in which edges of the tongues 5 of the diaphragm spring 16 are bent, e.g., by press machining, in opposite directions to form vane-like shape for supplying air into the internal space through the slits 15 as shown by arrows A when the diaphragm spring 16 rotates in the direction X. However, large-scale equipment is required for forming the tongues 5 of such shape and results in high cost. Further, the modified shape of the tongues alone can not attain good flowing condition of the air in the internal space 20, and thus, can not sufficiently perform the cooling function. The object of the invention is to overcome these problems.

DISCLOSURE OF INVENTION

The present invention, as shown in FIGS. 1-8, provides a cooling mechanism for a clutch assembly including a clutch cover body 12 of dish-like shape provided with a central aperture of a large diameter, and a diaphragm spring 16 having a radially outer annular spring portion 16a pinched by means of a pair of wire rings 17 to the clutch cover body 12. The diaphragm spring 16 includes a plurality of radial tongues 5 which extend radially inwardly from the inner periphery of the annular spring portion 16a with slits 15 therebetween. Vane members, which include vanes 4b, projecting out of the slits 22 for feeding air into the slits. Vane supports 4a, which are formed integrally with the vanes 4b are fixed to the tongues 5. Ventilation ports 2 connecting to an internal space 20 in the clutch cover assembly 1 are formed at radially outer portions of the clutch cover body 12.

BRIEF DESCRIPTION OF THE DRAWINGS

FIG. 3 is an end view of the vane member taken in the direction of arrow III, FIG. 2;

FIG. 4 is a side view of the vane member taken in the direction of the arrow IV, FIG. 2;

FIG. 5 is a sectional view of the vane member and the tongues of the diaphragm spring at V—V, FIG. 1;

FIG. 7, is a view similar to FIG. 1, with the clutch cover removed, showing an embodiment of the invention in which tongues of the diaphragm spring, adjacent the vane member are removed;

FIG. 8 is a cross sectional view, similar to FIG. 5 but showing a further embodiment of the vane member;

BEST MODE FOR CARRYING OUT THE INVENTION

Figure 9:
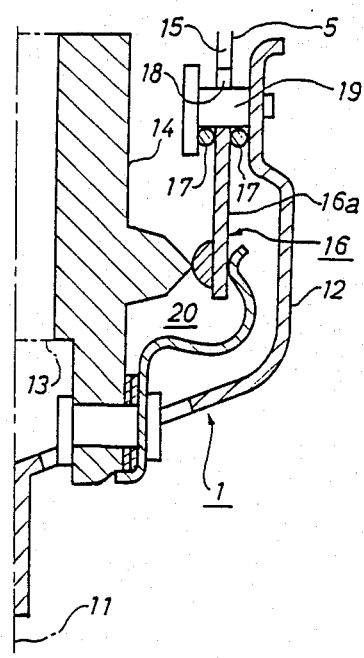
FIG. 9 is a sectional side view of a clutch cover assembly of the prior art.
Figure 10:
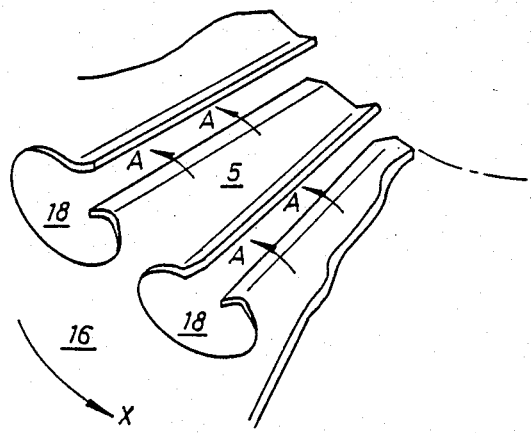
FIG. 10 is a perspective view of a prior art diaphragm spring.

In a clutch cover assembly 1 of the present invention, a clutch cover body 12 is, as previously described in FIG. 9, fixed to a flywheel 11, and forms, together with the flywheel 11, an internal space 20, in which a clutch disk 13 and a pressure plate 14 for pressing the clutch disk 13 against the flywheel 11 are concentrically disposed.

Figure 1:
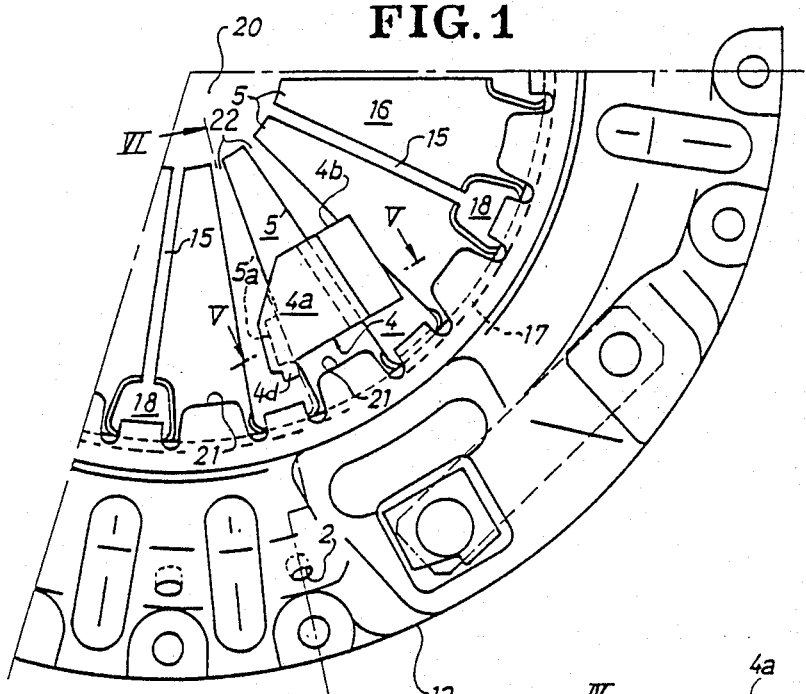
FIG. 1 is a partial rear view of the clutch housing assembly of the instant invention.

As disclosed in FIG. 1, which is a schematic fragmentary elevation view of the invention, a diaphragm spring 16 fixed to the clutch cover body 12 is provided with a plurality of radial tongues 5 extending radially from the center side thereof. Slits 15 are formed between the tongues 5. Each tongue 5 performs a function as a lever. Further, openings 18 are formed radially outside the the slits 15. The openings 18 are wider than the slits 15. A pair of wire rings 17 having a same diameter are pinched by tabs 21 fitted into the openings 18, so that the diaphragm spring 16 is fixed by the clutch cover body 12.

The clutch cover body 12 is provided at the radially outer side with ventilation ports 2, which is used, as will be described later, to discharge air fed into the internal space 20 in the clutch cover assembly 1 by virtue of vane members 4.

Figure 2:
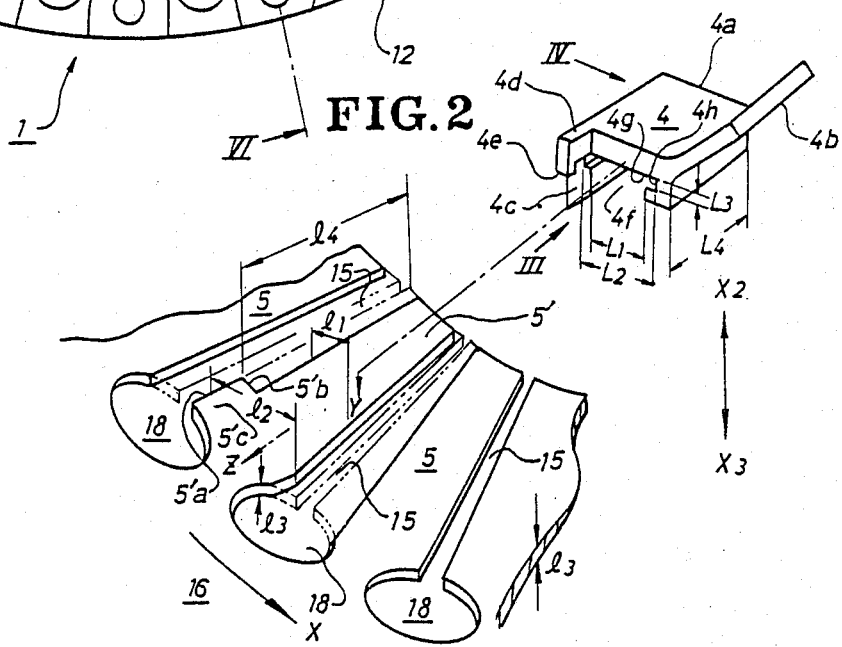
FIG. 2 is an enlarged perspective view showing the diaphragm spring with the vane member of the instant invention in exploded position.

As shown in FIG. 2, the edges of some of the spaced tongues 5' are cut away or recessed, except for the portions which continues to the edges of the openings 18, so that they have narrower shapes than others and are provided with projections 5a. In the embodiment, as shown by image lines in FIG. 2, the edges of the tongues 5' adjacent to opposite sides of the tongues 5' are recessed to form the wide slits 15 at opposite sides of the tongues 5', respectively.

A vane member 4 is made from resin, and a vane support 4a has a section of substantially rectangular shape of which one side is removed. Its cut portion 4f has a width L1 substantially equal to a width 1 1 between a radially inner end 5'b of the projection 5'a of the tongue 5' and the end of the tongue 5'. A width L2 of an inner surface 4g of the tongue support has a width L2 substantially equal to a width 1 2 of the tongue 5' including the projection 5'a. A length L4 of the vane member 4 is not longer than a length 1 4 of the tongue 5' between the radially inner end 5'b of the projection 5'a and the end of the tongue 5'. A height L3 of an inner side surface 4h of the vane support 4a is substantially equal to the thickness 1 3 of the tongue 5'.

As shown in FIG. 3, which is a front view of the vane member 4, a vane 4b for feeding air into the slit 15 is formed integrally at the upper end of the right side surface of the vane support 4a to cover the slit 15. In the embodiment, an air guide 4c is integrally formed at the lower end of the left side surface for effectively supplying the air fed through the slit 15 into friction surfaces in the internal space 20 in the clutch cover assembly.

As shown in FIG. 4, which is a left side view of the vane member 4, an engagement portion 4d is substantially L-shaped, and is integrally formed at the upper end of a plane surface 4j of the vane support 4a so that 4g may be flush with a lower end surface 4i extending in the longitudinal direction. Thus, in order to fix the vane member 4 to the tongue 5', as shown at an arrow Y in FIG. 2, the side of the vane member 4 provided with the engagement portion 4d is fitted at a side of X3 (flywheel side) from a side of X2 (clutch cover body side) adjacent the end of the tongue 5', and then, the vane member 4 is pushed toward the opening 18 as indicated at an arrow Z. Whereby, a concave portion 4e of the engagement portion 4d contacts the side edge 5'b of the projection 5'a and is pushed over the upper surface 5'c of the projection 5'a, and further, engages at the vicinity of the edge of the opening 18 to fix the vane member 4 to a portion of the tongues 18 adjacent to the opening 18.

According to the above structures, in the engaged condition of the clutch, the clutch cover body 12 rotates together with the flywheel 11, as shown in FIG. 5. Thus, the tongues 5, 5' of the diaphragm spring fixed to the clutch cover body 12 rotate in the direction X. Thus, the air faced to the vanes 4b is fed into the slits 15 as shown by the arrow A. The air fed into the internal space 20 in the clutch cover assembly collides with the air guide 4c and is fed to the friction surfaces between the flywheel 11 and the clutch disk 13 and between the clutch disk 13 and the pressure plate 14 and toward the side of the pressure plate 14 adjacent to the clutch cover body 12 to absorb the heat in the friction surfaces for cooling the flywheel 11, the clutch disk 13 and the pressure plate 14.

The air, which has absorbed the heat generated at the friction surfaces in the clutch cover assembly in this way, finally is discharged through the ventilation ports 2.

Figure 6:
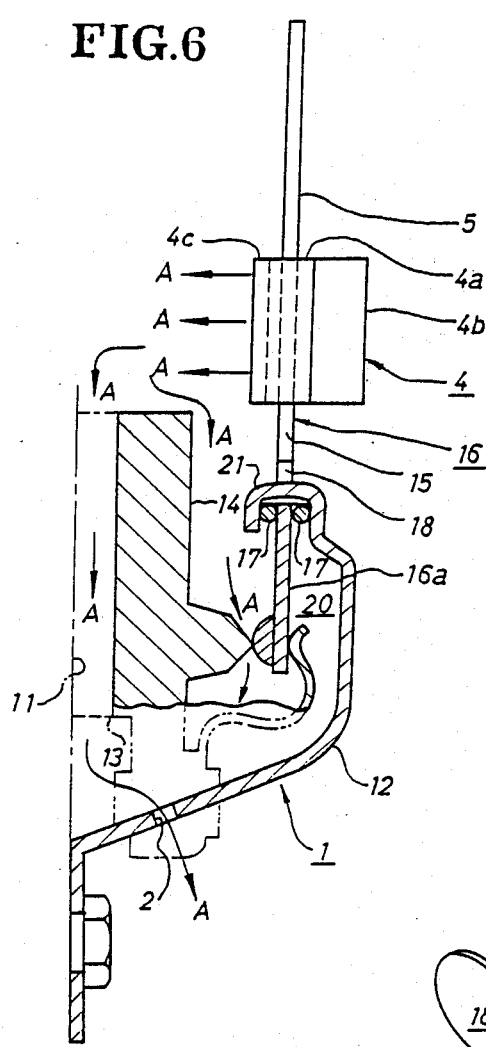
FIG. 6 is a side cross section view of the clutch housing assembly of FIG. 1 taken at the line VI—VI, FIG. 1.

According to the invention, as described above;

(1) the air fed into the slits 15 by the vanes 4b is fed, as shown in FIG. 6, to the friction surfaces between the flywheel 11 and the clutch disk 13 and between the clutch disk 13 and the pressure plate 14 and toward the side of the pressure plate 14 adjacent of the clutch cover body 12, so that the heat generated in the friction surfaces are absorbed by the air to cool them. Therefore, even in severe conditions at which the clutch is frequently and repeatedly engaged and released, the friction surfaces are cooled by virtue of the cooling function, and there is no problem such as thermal damage of the friction member of the clutch disk 13 and deflection or curving of the pressure plate 14.

(2) The ventilation ports 2 formed at the outer peripheral portion of the clutch cover body can efficiently circulate the air fed into the internal space to increase the cooling effect.

(3) The vane members 4 employed in the present invention are made from easily manufacturable resin, so that the manufacturing cost is low and the conventional diaphragm spring can be economically utilized.

FIG. 7 illustrates another embodiment of the invention. This embodiment is similar to that described above except for tongues formed at the diaphragm spring 16 and shape of vane members 4 mounted, in this embodiment, on the tongues 5'.

In this embodiment, the diaphragm spring 16 includes many radial tongues 5 similar to those in the above embodiment. However, in this embodiment, as shown in FIG. 7, some of the tongues 5 spaced to each other are removed to form spaces enlarged 23.

The tongues 5 adjacent in the opposite direction with respect to the rotating direction X fixedly support vane members 40.

As shown in FIG. 8, a vane support 40a of each vane 40 has an aperture 40e having a rectangular section and taperingly extending along the configuration of the tongue. The aperture 40e has side surfaces 40h having heights L3 equal to the thickness 1 3 of the tongue 5, respectively. Thus, the vane members 40 are fitted to the tongues 5 through the radially inner ends thereof with the apertures 40e in the radially outwardly diverging position, and are pushed toward the clutch cover body 12, so that they may engage the tongues 5 at the vicinity of the opening 18.

Each vane support 40a includes a vane 40b, similarly to the previously described embodiment, which covers the space 23 when the vane member 40 is mounted.

Further, the vane members 40 include air guide 40c and engagement portions 40d (FIG. 7), similarly to the vane members 4 in the previously described embodiment, respectively. Therefore, when the vane members 40 engage with the tongues 5, the engagement portions 40d engage the edges of the openings 18 of the tongues 5, so that the vane members 40 are fixed to the vanes 5 in the vicinity of the openings 18.

When the tongues formed in the diaphragm spring 5 rotates in the direction X, the air faced to the vanes 40b is fed into the space 23, and is fed by air guides 40c into the internal space 20 in the clutch cover assembly. As shown in FIG. 6, previously described, the air cools the friction portions in the clutch cover assembly 1 and is discharged through the ventilation ports 2.

INDUSTRIAL APPLICABILITY

The present invention can be employed in various clutches for automobiles employing diaphragm springs.

We claim:

1. A cooling mechanism in a clutch cover assembly including a clutch cover body of dish-like shape provided with a central aperture of a large diameter and a diaphragm spring having a radially outer annular spring portion pinched by a pair of wire rings to the clutch cover body, said diaphragm spring including a plurality of radial tongues which extend radially inwardly from said annular spring portion to the inner periphery of said annular spring portion with slits having enlarged openings at the radial outer end therebetween, characterized by that some of said tongues, spaced circumferentially from each other, are recessed at an edge of the tongue at the slit between said tongue and the adjacent tongue, except for the portion of said edge adjacent to said opening, to reduce the width thereof, and a vane member having a vane support formed integrally with said vane mounted on each of said circumferentially spaced tongues with said vane support in the recess at the tongue edge and fixing said vane member to said tongues, said vane member having a vane projecting out from said support and the slit between the recessed vane and the contiguous adjacent vane for feeding air into said slit and ventilation ports connecting to an internal space in said clutch cover assembly at radially outer portions of said clutch cover body for discharging air fed into said clutch cover through said slits by said vane projections.

2. A cooling mechanism as recited in claim 1 wherein each vane support of each said vane member has a section of substantially rectangular shape with portions of one side removed.

3. A cooling mechanism as recited in claim 1 wherein each vane support of each said vane member is tapered and has a rectangular section.

4. A cooling mechanism as recited in claim 1 wherein some radial tongues spaced from each other among said tongues are recessed at the edge of the tongue at the slit between said tongue and the adjacent tongue except for the portion of said edge adjacent to said opening to reduce the width thereof, and said vane members include projections engaged with said recessed edge.

* * * * *